United States Patent
Krober et al.

(10) Patent No.: US 7,969,891 B2
(45) Date of Patent: Jun. 28, 2011

(54) ADJUSTMENT OF CLOCK APPROXIMATIONS

(75) Inventors: Hans-Martin Krober, San Jose, CA (US); James A. Baldwin, Redwood City, CA (US); David L. de Heer, Woodside, CA (US)

(73) Assignee: Microsoft Corporation, Redmond, WA (US)

( * ) Notice: Subject to any disclaimer, the term of this patent is extended or adjusted under 35 U.S.C. 154(b) by 1099 days.

(21) Appl. No.: 11/789,156

(22) Filed: Apr. 24, 2007

(65) Prior Publication Data

US 2008/0270800 A1  Oct. 30, 2008

(51) Int. Cl.
*H04L 12/26* (2006.01)
(52) U.S. Cl. ........................................... 370/241
(58) Field of Classification Search .................. None
See application file for complete search history.

(56) References Cited

U.S. PATENT DOCUMENTS

| | | | |
|---|---|---|---|
| 5,828,414 A | 10/1998 | Perkins et al. | |
| 5,936,968 A | 8/1999 | Lyons | |
| 6,259,677 B1 | 7/2001 | Jain | |
| 6,327,274 B1 | 12/2001 | Ravikanth | |
| 6,661,810 B1 | 12/2003 | Skelly et al. | |
| 6,957,357 B2 | 10/2005 | Liu et al. | |
| 7,023,884 B2 | 4/2006 | Chuah et al. | |
| 7,051,246 B2 | 5/2006 | Benesty | |
| 7,142,517 B2 | 11/2006 | Tseng et al. | |
| 7,173,945 B1 | 2/2007 | Liu et al. | |
| 2002/0100064 A1* | 7/2002 | Ward et al. | 725/144 |
| 2003/0174734 A1 | 9/2003 | Compton et al. | |

OTHER PUBLICATIONS

"Timing and Synchronization in Next-Generation Networks", Date: Jun. 29, 2006, http://ngn.symmetricom.com/pdf/application_notes/SrvcsApps.pdf.
Freyhult, Stefan, "Streaming Video on IP Networks", Date: 2004, http://www.nada.kth.se/utbildning/grukth/exjobb/rapportlistor/2004/rapporter04/freyhult_stefan_04024.pdf.
Williams, John, "Troubleshooting IP broadcast video quality of service", http://lw.pennnet.com/articles/article_display.cfm?Section=ARCHI&C=TestI&ARTICLE_ID=244808&KEYWORDS=JDSU&p=13.

* cited by examiner

*Primary Examiner* — Kevin C Harper

(57) ABSTRACT

Techniques to adjust clock approximations are described, which may be used to synchronize content output at a client. In an implementation, timestamps derived from a universal time source are allocated to respective program clock reference (PCR) timestamps in content received by a network operator during an interval of time to form ordered pairs of timestamps. An approximation is computed of a plurality of the ordered pairs of timestamps for the interval and the approximation is adjusted using an ordered pair of timestamps taken from a previous approximation.

20 Claims, 6 Drawing Sheets

ADJUSTMENT OF CLOCK APPROXIMATIONS

BACKGROUND

A network operator may provide a wide variety of content to clients. For example, the network operator may be configured as a head end to provide television content, video-on-demand, music and so on to clients, such as televisions, digital video recorders and set-top boxes. The network operator typically obtains this content from content providers for streaming to the clients, such as households, businesses and so on. To provide this content, the network operator configures the content into a form that is suitable for use by the households. For example, the network operator may change a format of the content, map the content to particular channels, and so on such that the content is in a form that is suitable for consumption by the clients.

To perform this configuration, the network operator may employ a variety of devices, such as integrated receivers/decoders, encoders, servers, and so on. However, these devices may be provided through use of a distributed system. Therefore, the distribution of the devices may introduce data impairment due to communication of the content between the distributed devices, including jitter and loss to the content as clocks used to coordinate output of the content by the devices lose synchronization. Consequently, the data impairment may lead to errors by the client when consuming the content, such as improper playback including missed frames, repeated frames, and so on. Thus, the clients may output the content in a manner that does not follow the intended content-viewing experience.

SUMMARY

Techniques to adjust clock approximations are described, which may be used to synchronize content output at a client. In an implementation, timestamps derived from a universal time source are allocated to respective program clock reference (PCR) timestamps in content received by a network operator during an interval of time to form ordered pairs of timestamps. An approximation is computed of a plurality of the ordered pairs of timestamps for the interval and the approximation is adjusted using an ordered pair of timestamps taken from a previous approximation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
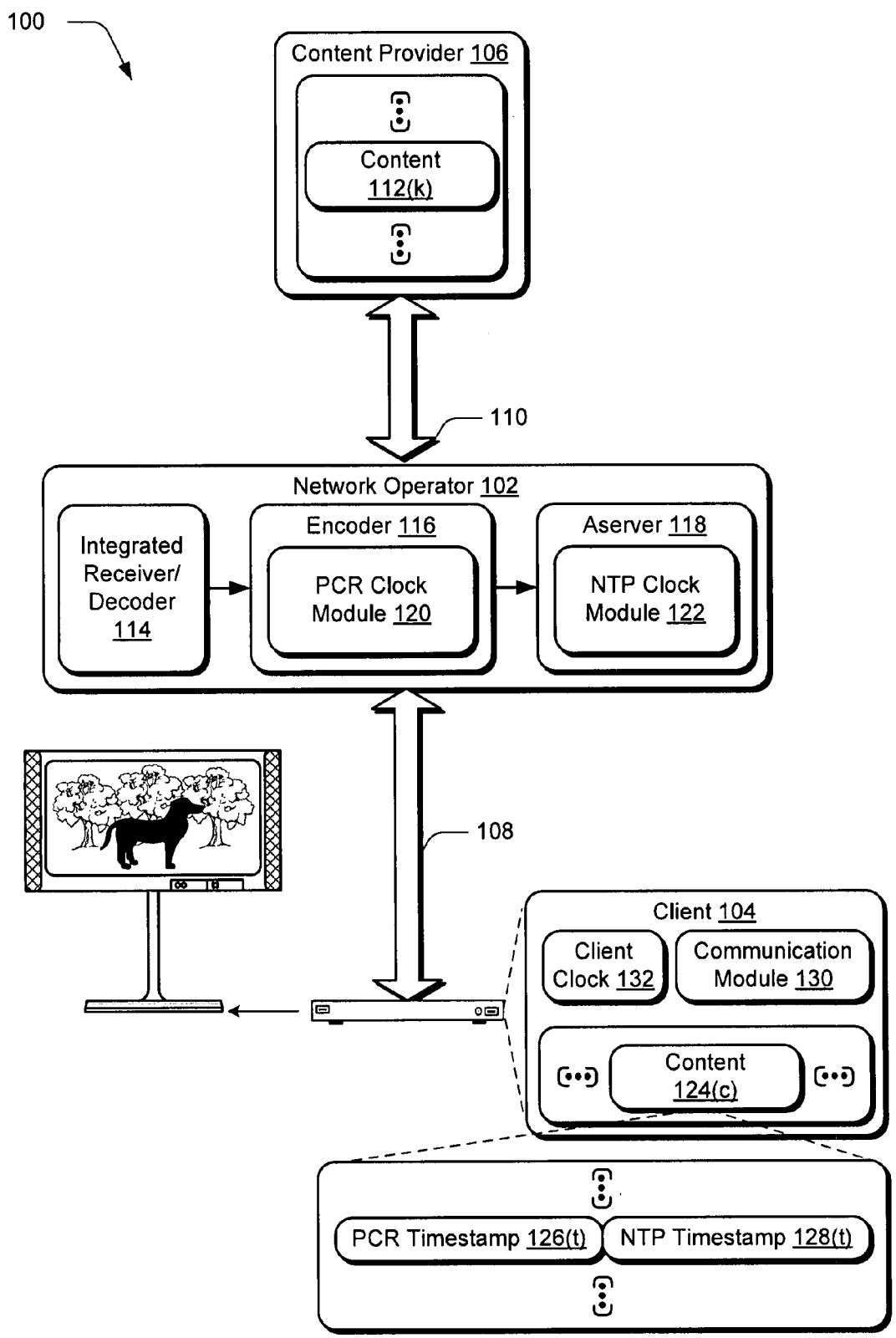
FIG. 1 is an illustration of an environment in an exemplary implementation that is operable to employ techniques to provide clock approximations.

Network operators typically obtain content from content providers to be streamed to clients, such as households, businesses, educational institutions, and so on. The network operator, however, may employ a variety of devices to provide this content which may be implemented as a distributed system. Because the system is distributed, however, the content may be communicated over network such that a clock used to synchronize output of the content may become inaccurate.

For example, the content may be communicated as packets over an Internet Protocol (IP) network such that packets may be received out of order, experience variances in communication delay, and so on. Clients, however, were typically configured to synchronize their clocks with the clocks of the network operator to provide synchronized content output. Therefore, the loss of synchronization of the packets and indications of time within the packets may result in output errors at the client, such as skipped or repeated frames on a television.

Techniques are described to provide clock approximation, which may be used to synchronize content output at a client. The network operator, for instance, may receive content at a first device (e.g., an encoder) and provide a program clock reference (PCR) as the content is received, such as to packets of the content. The content may then be communicated from the encoder to a second device (e.g., a server) that is responsible for causing the content to be streamed to a client. The first device and the second device, however, may be communicatively coupled via an Internet Protocol (IP) network and therefore the packets may experience different communication delays, be received out-of-order, and so on. The second device (e.g., the server), upon receipt of the content, may provide a timestamp based on a universal time source (e.g., according to a network time protocol (NTP)) timestamp for each of the PCR timestamps to form ordered-pairs of timestamps. The content having the ordered pairs of timestamps may then be provided to the clients, which are used to synchronize clocks local to the clients, such as by adjusting the local clock based on timestamp ratios. In this way, the local clock of the client may be synchronized with the network operator to synchronize output of the content.

Additionally, the second device may use approximation techniques which may be used to "smooth" the ordered pairs of timestamps sent to the clients. As previously described, the content may experience varied delays when being communicated through the distributed system. In order to minimize effects of these varied delays, the second device in the previous example may approximate when the timestamps from the universal time source (e.g., NTP timestamps) "should" have been allocated, i.e., if the content did not experience the variance in the communication delays. In other words, this estimation may be a "best guess" regarding the clock if such variance in the delays was not encountered.

This approximation may be used to provide ordered pairs of timestamps to the client to provide linear output of the content at the client. In an implementation, the approximations are provided for intervals of time. These approximations may then be adjusted based on previous approximations to "smooth" transitions between the approximations such that the approximations do not "jump" and therefore cause an inordinate amount in a time shift between the ordered pairs of timestamps provided to the clients, thereby further "smoothing" output of the content by the client. Further discussion of adjustment of approximations may be found in relation to the following figures.

In the following discussion, an exemplary environment is first described that is operable to perform techniques to adjust clock approximations. Exemplary procedures are then described that may be employed in the exemplary environment, as well as in other environments. Although adjustment of clock approximations is described in a television environment in the following discussion, it should be readily apparent that these techniques may be employed in a wide variety of environments without departing from the spirit and scope thereof.

Exemplary Environment

FIG. 1 is an illustration of an environment 100 in an exemplary implementation that is operable to employ techniques to adjust clock approximations. The illustrated environment 100 includes a network operator 102 (e.g., a "head end"), a client 104, and a content provider 106 that are communicatively coupled via network connections 108, 110. In the following discussion, the network operator 102, the client 104 and the content provider 106 may be representative of one or more entities, and therefore reference may be made to a single entity (e.g., the client 104) or multiple entities (e.g., the clients 104, the plurality of clients 104, and so on). The client 104, in portions of the following discussion, may also relate to a person and/or entity that operate a device. In other words, the client 104 may describe a logical client that includes software and/or devices. Additionally, although a plurality of network connections 108-110 are shown separately, the network connections 108-110 may be representative of network connections achieved using a single network or multiple networks.

The client 104 may be configured in a variety of ways. For example, the client 104 may be configured as a computer that is capable of communicating over the network connection 108, such as a desktop computer, a mobile station, an entertainment appliance, a set-top box communicatively coupled to a display device as illustrated, a wireless phone, and so forth.

The content provider 106 includes one or more items of content 112(k), where "k" can be any integer from 1 to "K". The content 112(k) may include a variety of data, such as television programming. The content 112(k) is communicated over the network connection 110 to the network operator 102, such as through a broadcast.

Content 112(k) communicated via the network connection 110 is received by the network operator 102 and configured for distribution to the client 104 over the network connection 108. Distribution from the network operator 102 to the client 104 may be accommodated in a number of ways, such as through a broadcast including cable, radio frequency (RF), microwave, digital subscriber line (DSL), and satellite.

As previously described, the network operator 102 may employ a variety of devices which may be implemented via a distributed system, such as an integrated receiver/decoder 114, an encoder 116 and a video acquisition server (e.g., an Aserver 118) as shown in FIG. 1. A system-wide clock may be maintained via a universal time source (e.g., accordingly to a network time protocol (NTP)) to allow the devices which form the environment 100 to maintain synchronized clocks (e.g., to millisecond accuracy), such as from the Aserver 118 (which may be part of the "back end" of the network operator 102), a "client-facing" server of the network operator 102, the client 104, and so on. However, some devices (e.g., the encoder 116) do not traditionally use this notion of a clock. Because the client 104 may be configured to display the content 112(k) at precise moments in linear-shifted time as indicated by the encoder 116, however, the content 116(k) may not be displayed as intended by the client 104, such as by skipping or repeating frames in television content.

The Aserver 118 may be configured to provide a wide range of functionality, including condition a video stream for transmission using a packet-switched network. In an implementation, the Aserver 118 is configured to translate between "encoder time" and the time derived from a universal time source, e.g., "NTP time". For instance, the Aserver 118 may be positioned "closest" to the encoder 116 in a system of the network operator 102 and therefore experience a least amount of data impairment including jitter and loss when compared to other devices employed by the network operator 102 with relation to the encoder 116.

Even though the Aserver 118 is the "closest" device to the encoder 116, however, there are a variety of issues that are addressed by the Aserver 118 to provide this translation. In one issue, IP packets delivered from the encoder 116 to the Aserver 118 may experience a variable time delay, which may be exacerbated by thread scheduling and therefore timestamps that are associated by the Aserver 118 with the packets received from the encoder may be "jittery". For example, content configured in accordance with Motion Pictures Experts Group (MPEG) protocols may assume a constant communication delay and therefore jitter that is experienced is not accounted for using these protocols, which may therefore cause output errors when so encountered.

In another issue, the Aserver 118 resolves clock drift between the encoder's 116 clock and the universal time source employed by other devices in the environment. For example, an NTP clock may be based on an atomic clock and therefore be considered stable such that devices which employ the NTP clock have a "correct" notion of time. The encoder 116, however, may base a notion of time on internal clocks, streams of content that are input to the encoder 116, and so on. These clocks may be slightly faster or slower than the NTP time and may even vary over time. Consequently, the network operator 102 may employ an approximation to estimate encoder 116 clock drift and reduce and even eliminate timestamp jitter.

In one or more implementations, time is communicated from the encoder 116 to the Aserver 118 using program clock reference (PCR) timestamps included in the content 112(k), which may be provided through use of a PCR clock module 120. The Aserver 118, associates the PCR timestamps with timestamps derived from a universal time source (e.g., NTP timestamps) as the content is received at the Aserver 118 to form ordered pairs of timestamps using a module that employ a universal time source, which is illustrated as an NTP clock module 122 in FIG. 1. Rather than provide the ordered pairs of timestamps directly to the client 104, however, the Aserver 118 may compute an approximation to "smooth" the timestamps. Therefore, the content 124(c) (where "c" can be any integer from one to "C") received at the client 104 may include the ordered pairs of timestamps (illustrated as PCR and NTP timestamps 126(t), 128(t) in FIG. 1) that may be used by the communication module 130 of the client 104 to synchronize the client clock 132 for output of the content 124(c). For instance, the client clock 132 may be synchronized with one or more clocks of the network operator 102 to provide intended content output, such as for linearly-shifted output of the content 124(c). Further discussion of the approximation and synchronization may be found in relation to the following figure.

Figure 2:
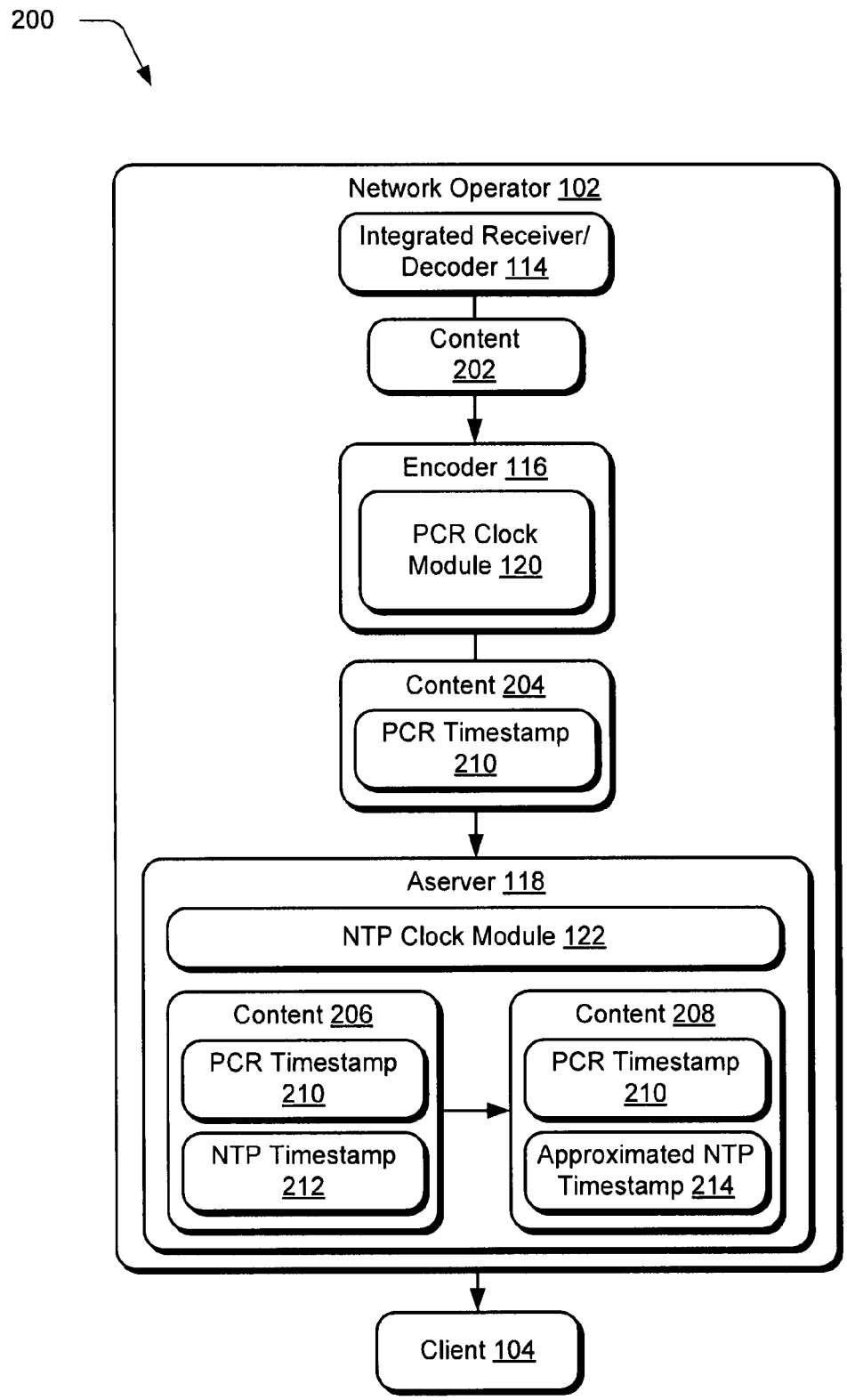
FIG. 2 is an illustration of a system employing a network operator and a client of FIG. 1 in greater detail.

FIG. 2 illustrates an exemplary implementation of a system that employs the integrated receiver/decoder 114, the encoder 116 and the Aserver 118 of the network operator 102 and the client 104 of FIG. 1. In FIG. 2, progression of a single item of content through the system 200 is shown through content 202, 204, 206 and 208. The content 202-208 may be the same as or different from content 112(k) of FIG. 1. In the following discussion, NTP is used as an example of a universal time source.

The integrated receiver/decoder 114 communicates content 202 to the encoder 116. The encoder 116 then communicates content 204 to the Aserver 118 that includes a PCR timestamp 210. For example, the PCR clock module 120 may use a 42-bit counter which increments at 27 MHz such as to output the PCR timestamp 210 to approximately every one or two frames of television content on average, or sixteen to thirty-three milliseconds.

Traditional MPEG broadcast systems assumed a constant communication delay between the encoder 116 and the client device 104. This assumption, when accurate, allowed the client 104 to synchronize the client clock 132 of FIG. 1 directly to the PCR timestamps 210 upon receipt, such that the client 104 operates in a synchronized fashion with the encoder 116. Therefore, in such systems the network operator 102 and the devices of the network operator 102 and the environment 100 (e.g., the client 104) were to share a same concept of time. The network operator 102, however, may have a multitude of encoders 116 such that synchronization of the system 200 to a single encoder 116 is not feasible in such an environment. Consequently, a NTP reference for the system 200 may be used to determine how each of the encoder's 116 clocks is drifting.

The Aserver 118, for instance, may capture the PCR timestamp 210 (e.g., a PCR packet) in the content 206 and associate it with an NTP time at which the PCR timestamp 210 was generated by the encoder 116 plus a constant time delay as an NTP timestamp 212. When the client 104 receives the associated timestamps, the client 104 may thus determine "when" to output the content.

It should also be noted that these techniques may also address clock drift between the PCR time of the encoder 116 and NTP time employed elsewhere in the system 200. For example, assume that manufacturing tolerances may allow for up to 100 PPM (or 0.01%) of clock inaccuracy and note that NTP time has effectively 0 PPM inaccuracy with respect to a universal clock reference. Assuming a 59.97 Hz frame rate (or 16.68 millisecond frame period), an uncorrected client 104 would skip or repeat a frame every 16.68 milliseconds/0.01%, or every 166.8 seconds in such a system.

Through use of the associated timestamps, the question may be answered as to "when the encoder 116 provided the PCR timestamp, what was the NTP time?" Therefore, in an implementation the Aserver 118 does not communicate a frequency difference between the clocks, but rather may leave this determination to the client 104, which may use the NTP timestamps as a guide. It should be apparent that other techniques are also contemplated, such as through determination of the frequency difference elsewhere in the environment 100 of FIG. 1.

Jitter may be thought of as a difference between how long it takes an average packet to reach the Aserver 118 and the observed time of individual packets. In an example, the Aserver 118 may be connected to the encoder 116 using a single relatively high performance router and therefore experience microsecond-level jitter although in other examples jitter may be on an order of four milliseconds or less. In a zero-jitter system (i.e., one with a constant time delay), the NTP time may be stamped when the packet was received as the correspondence time and would therefore provide the information used to synchronize clocks to the rest of the system 200. Jitter may be contributed from a variety of sources, such as from a network, from thread scheduling by a device, and so on.

Figure 3:
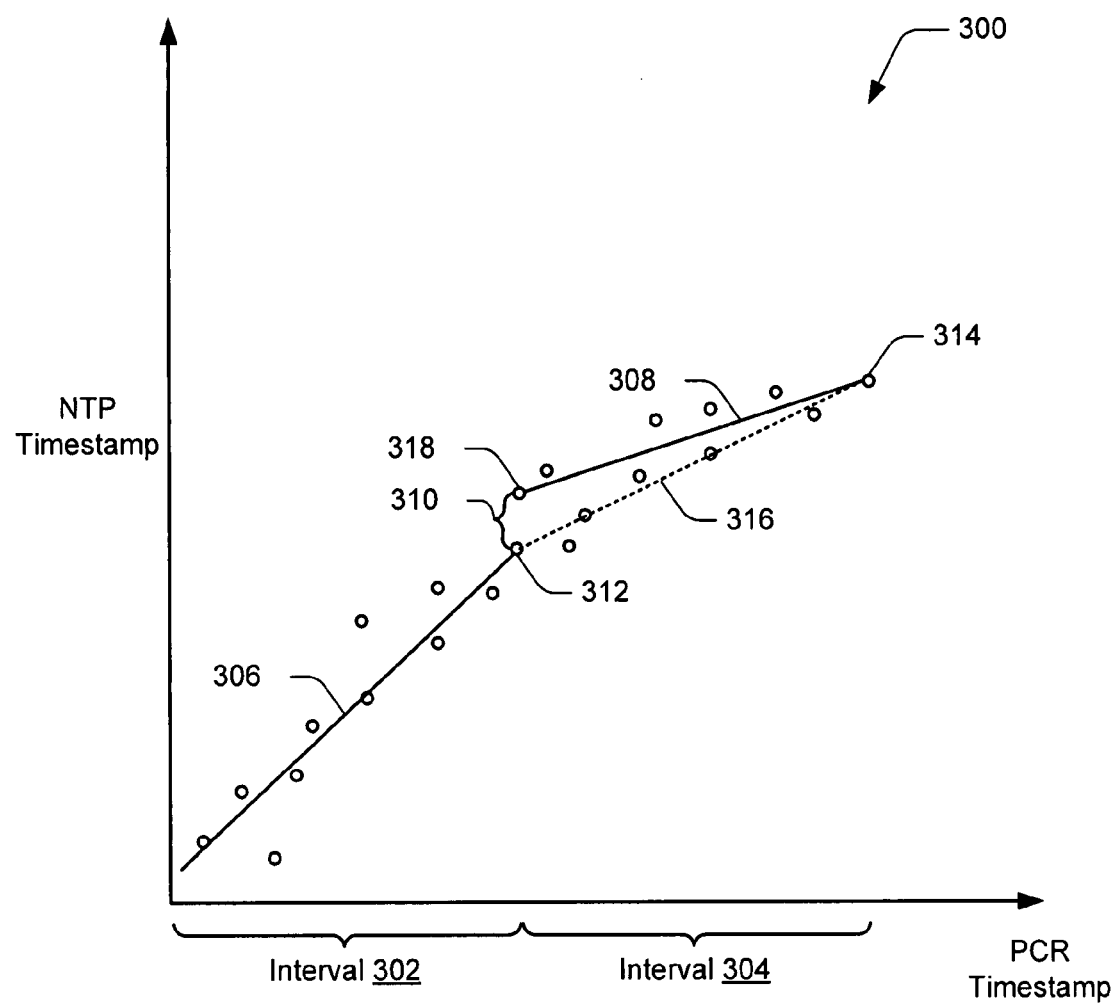
FIG. 3 depicts a graph in an exemplary implementation showing an exemplary relationship between timestamps from a universal time source and program clock reference (PCR) timestamps.

FIG. 3 depicts a graph 300 in an exemplary implementation showing an exemplary relationship between NTP and PCR timestamps. For example, Aserver 118 may receive packets having PCR timestamps $t_{pcr}[1]$ to $t_{pcr}[n]$. When the packets arrive at the Aserver 118, the packets may receive a corresponding timestamp of $t_{ntp}[1]$ to $t_{ntp}[n]$.

The difference between $t_{pcr}[1]$ and $t_{pcr}[n+1]$ may have a normal expected amount, such as 30 milliseconds, and therefore in this example the quantum of the time counter is $\frac{1}{27}$ MHz or 37 nanoseconds. 30 milliseconds in 37 nanoseconds quanta yields a count of around 810,000. If the NTP clock and the PCR clock (i.e., the encoder 116 clock) differ by a maximum of 100 PPM, the difference in the two counts for this interval is approximately 81.

The result of timestamping the PCR packets $t_{pcr}[i]$ with jittery NTP timestamps $t_{ntp}[i]$ yields a set of ordered pairs $(t_{pcr}[1], t_{ntp}[1]$ to $t_{pcr}[n], t_{ntp}[n])$. In this example, the NTP timestamps $t_{ntp}[i]$ are jittery and the PCR times $t_{pcr}[i]$ are considered "well behaved" and thus the $t_{ntp}[i]$ are treated as dependent values in these ordered pairs.

When graphing these ordered pairs as shown in intervals 302, 304 of FIG. 3, a "noisy" result is realized, with a slope of the line being one plus (or minus) a relatively small clock offset and the intercept of the line being the time different between the two clocks at PCR time equal zero. The uncorrected NTP timestamps $t_{ntp}[i]$ fall above or below the line more or less randomly due to jitter in this example. In this example, a line is employed (rather than some other curve) to approximate the physical phenomenon observed by the different clocks. That is, over short periods of time an NTP clock may be considered to have a constant frequency while a PCR clock may be considered to have another slightly different constant frequency. Over the long term, however, the relative frequencies change slowly over time, and thus this approximation may yield a piece-wise linear approximation of long-term frequency drift.

The NTP timestamps that fall on the lines 306, 308 for the respective intervals may be considered "ideal" NTP timestamps since these timestamps may be considered to accurately reflect NTP time as a function of PCR time. That is, for any PCR value a corresponding NTP time may be chosen from the respective lines 306, 308.

A variety of computational methods may be used to compute the lines, such as by using a curve-fitting algorithm, examples of which include a Least Squares Fitting Algorithm, Linear Regression, and so on. Using these computational methods, an approximation may be created of an underlying relationship between PCR time and NTP time, which may then be used to compute a jitter-corrected NTP timestamp $t_{ntp}[i]$ for each PCR timestamp $t_{pcr}[i]$.

Returning back to FIG. 2, as previously described the Aserver 118 may capture the PCR timestamp 210 (e.g., a PCR packet) in the content 206 and associate it with an NTP time at which the PCR timestamp 210 was generated by the encoder 116 plus a constant time delay as an NDP timestamp 212. The Aserver 118, through execution of the NTP clock module 122, may then "smooth" the NTP timestamps 212 through use of an approximation such that the content 208 includes a PCR timestamp 210 as received from the encoder 116 and an approximated NTP timestamp 214 that is used to reduce jitter caused by communication of the content 202-208 through the system 200. The content 208 having the PCR timestamp 210 and the approximated NTP timestamp 214 may then be communicated to the client 104 to synchronize the client's clock 132.

The approximations may be computed in a variety of ways, such as by using a curve-fitting algorithm, further discussion of which may be found again in relation to FIG. 3. For example, the Aserver 118 may associate NTP timestamps for PCR timestamps received during interval 304 such that a "jittery" output is observed by the points shown for interval 304. The Aserver 118 may then employ a curve-fitting algorithm to generate a line 308 to "smooth" these points. However, as shown in FIG. 2, a "jump" is realized between the line 306 for the previous interval 302 and the line 308 computed using the curve-fitting algorithm for interval 304.

In an implementation, techniques are described to further "smooth" approximations (e.g., lines 306, 308) used between the successive intervals 302, 304 by adjusting the approximations. For example, the Aserver 118 may adjust the line 308 for interval 304 by employing a point 312 from a previous approximation (e.g., line 306) and a point 314 from the line 306 to create a new line 316 that does not include the "jump" 310 from point 312 to point 318. In other words, the adjustment to line 308 may be made to form line 316 to ease the transition to point 314 from the line 306 of the previous interval. In this way, the client 104 may output the content 124(c) as intended by synchronizing the client clock 132 using PCR/NTP timestamps taken from the adjusted approximation represented by line 316. Further discussion of adjustment of approximations may be found in relation to the following procedures.

Generally, any of the functions described herein can be implemented using software, firmware, hardware (e.g., fixed-logic circuitry), manual processing, or a combination of these implementations. The terms "module", "functionality" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices. The features of the techniques to adjust clock approximations are platform-independent, meaning that the techniques may be implemented on a variety of commercial computing platforms having a variety of processors.

Exemplary Procedures

The following discussion describes techniques that may be implemented utilizing the previously described environment, systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1, the system 200 of FIG. 2 and/or the graph 300 of FIG. 3.

Figure 4:
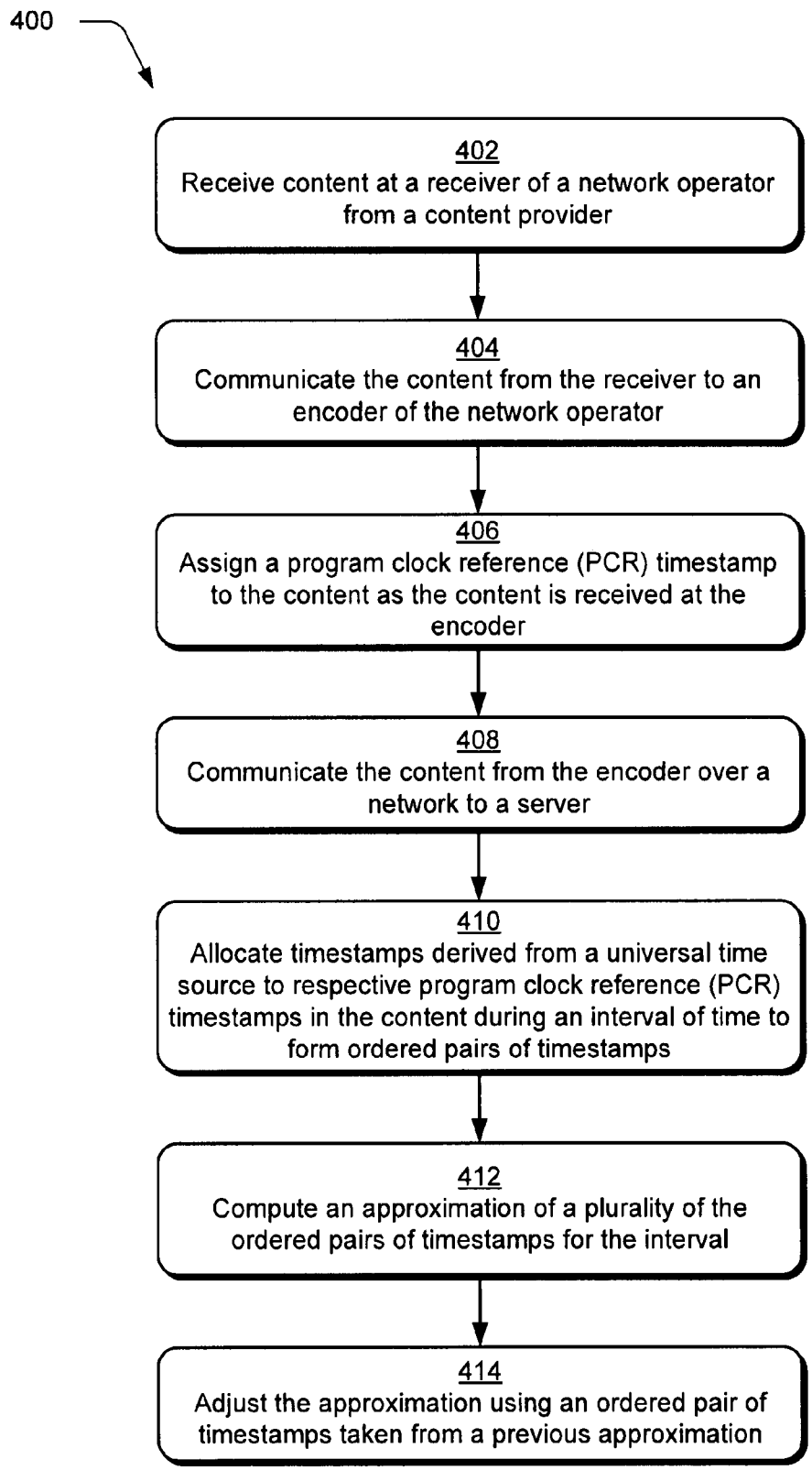
FIG. 4 is a flow diagram depicting a procedure in an exemplary implementation in which an approximation of timestamps is adjusted using at least one point from a previous approximation.

FIG. 4 depicts a procedure 400 in an exemplary implementation in which an approximation of timestamps is adjusted using at least one point from a previous approximation. Content is received at a receiver of a network operator from a content provider (block 402). The integrated receiver/decoder 114, for instance, may receive content 112(k) from the content provider 106 via the network connection 110.

The content is then communicated from the receiver to an encoder of the network operator (block 404). Continuing with the previous instance, the encoder 116 may encode the content 112(k) into a form that is suitable for communication over the network connection 108 and/or consumption by the client 104.

A program clock reference (PCR) is assigned to the content as the content is received at the encoder (block 406), such as through a counter as previously described, through use of an internal clock, and so on. The content is then communicated from the encoder over a network to a server (block 408), such as to the Aserver 118 of FIG. 1 which is responsible for streaming the content 112(k) over the network connection 108 to the client 104.

Timestamps derived from a universal time source are allocated to respective program clock reference (PCR) timestamps in the content during an interval of time (block 410). For example, the Aserver 118 may allocate NTP timestamps to respective PCR timestamps to form a distribution of points shown for interval 304 of FIG. 3.

An approximation is then computed of a plurality of the ordered pairs of timestamps for the interval (block 412) and the approximation is adjusted using an ordered pair of timestamps taken from a previous approximation (block 414). The approximation may be computed and adjusted in a variety of ways, further discussion of which may be found in relation to the following figure.

Figure 5:
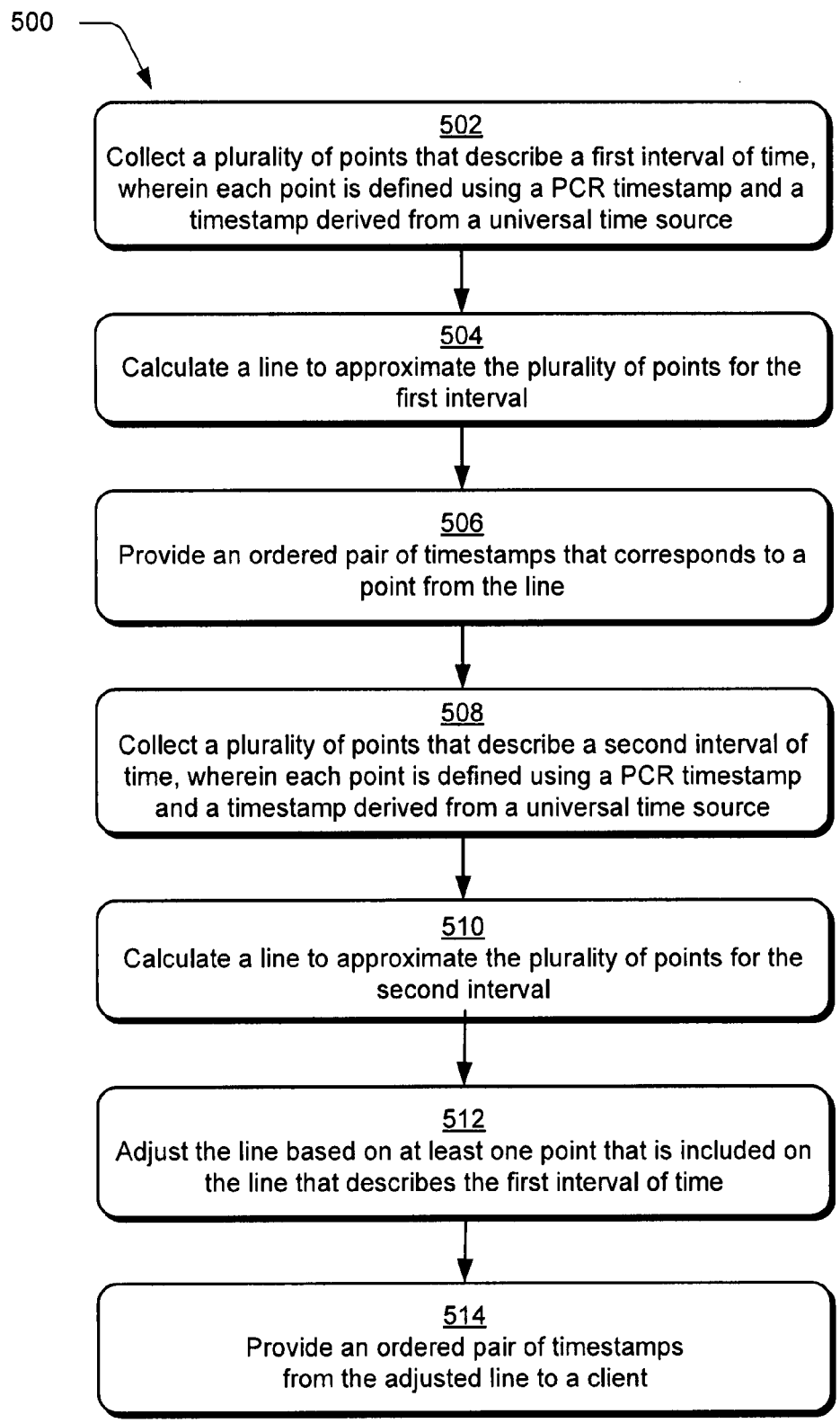
FIG. 5 is a flow diagram depicting a procedure in an exemplary implementation in which an approximation of FIG. 4 is formed and adjusted in greater detail

FIG. 5 depicts a procedure 500 in an exemplary implementation in which an approximation of FIG. 4 is formed and adjusted in greater detail. A plurality of points is collected that describe a first interval of time, wherein each point is defined using a PCR timestamp and a timestamp derived from a universal time source (block 502). The points, for instance, may be collected from the PCR/NTP timestamp ordered pairs formed by the Aserver 118 as content 112(k) is received from the encoder 116 for the interval of time, e.g., three seconds.

A line is calculated to approximate the plurality of points for the first interval (block 504). For example, the Aserver 118 may use a curve-fitting algorithm such as a Least-Squares Algorithm, Linear Regression, and so on to approximate the points which describe the interval to reduce jitter.

An ordered pair of timestamps may then be provided that corresponds to a point in the line (block 506). Continuing with the previous example, the Aserver 118 may provide point 312 from line 306 which describes interval 302 in the content 112(k) to client 104. The client 104 may then synchronize the client clock 132 to provide output of the content 124(c) as intended. A plurality of such points may be provided.

Likewise, the Aserver 118 may continue for a subsequent interval of time, such as to collect a second plurality of points that described a second interval of time, wherein each point is defined using a PCR timestamp and a timestamp derived from a universal time source (block 508). A line may then be calculated to approximate the second interval (block 510), such as to calculate line 308 to approximate the points for interval 304.

The line is then adjusted based on at least one point that describes the first interval of time (block 512). The Aserver 118 in this example may use point 312 from line 306 that approximates interval 302 to adjust line 308 to form a new approximation represented by line 316 in FIG. 3. For instance, point 312 which is toward an end of interval 302 and point 314 which is toward an end of interval 304 may be used to form line 316 and thus "smooth" a transition through interval 304 to point 314. An ordered pair of timestamps from the adjusted line may then be provided to a client (block 514) to be used to synchronize content output, an example of which involving PCR and NTP timestamps may be found in relation to the following figure.

Figure 6:
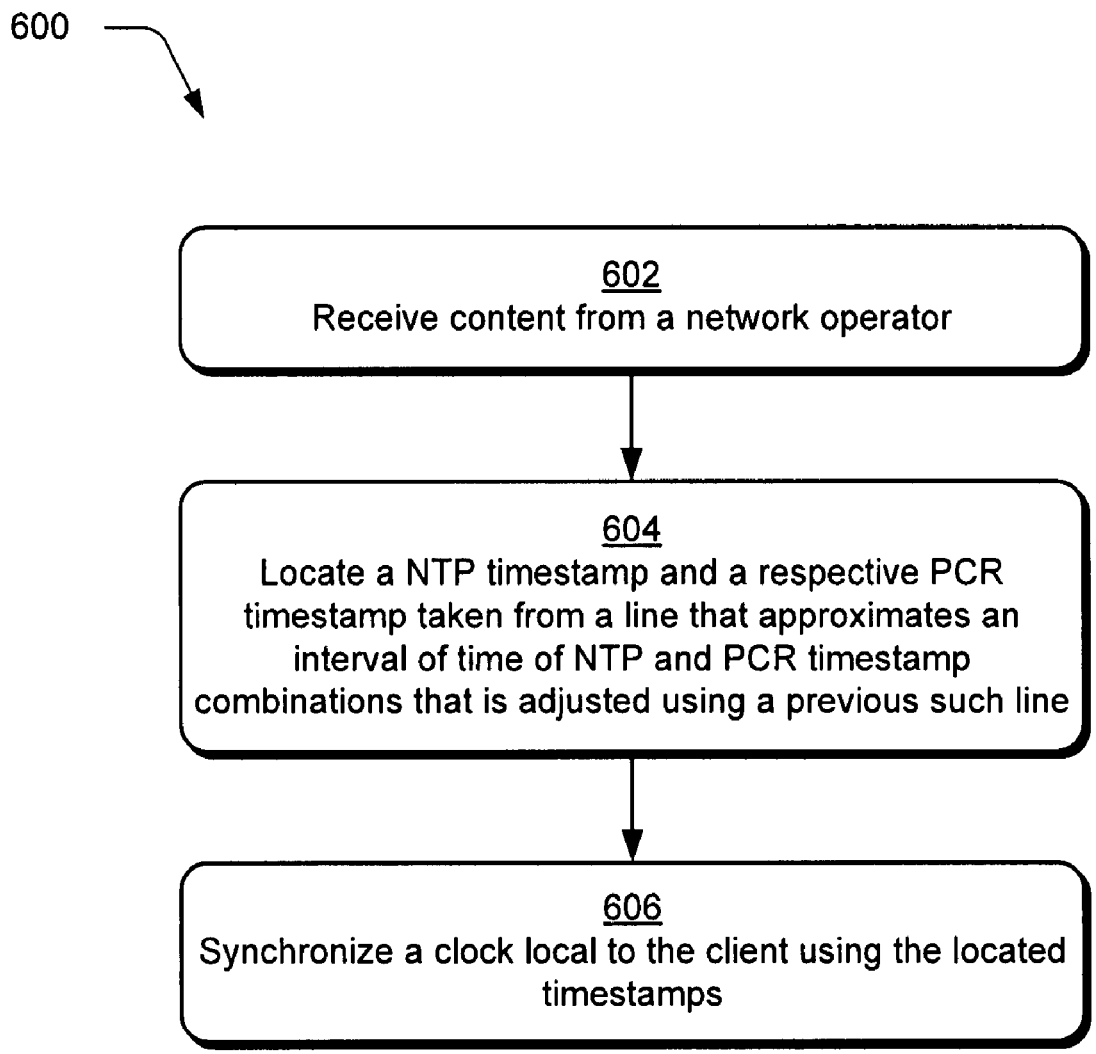
FIG. 6 is a flow diagram depicting a procedure in an exemplary implementation in which a client uses ordered pairs of timestamps to synchronize the client's clock to output content.

FIG. 6 depicts a procedure 600 in an exemplary implementation in which a client uses associated PCR/NTP timestamps to synchronize the client's clock to output content. Content is received by a client from a network operator (block 602), such as content 124(c) from network operator 102 over network connection 108, which may include content that is linearly-shifted in time such a video-on-demand, content stored by the network operator 102 employing network digital video recorder (DVR) functionality, live streaming video that experiences delay through a head end and network, and so on.

An NTP timestamp and a respective PCR timestamp are located which were taken from a line that approximates an interval of time of NTP and PCR timestamp combinations that is adjusted using a previous such line (block 604). The PCR/NTP timestamps 126(t), 128(t), for instance, may be taken from line 316 that was adjusted as described in relation to FIG. 5. A clock that is local to the client is then synchronized using the located timestamps (block 606). In this way, the client 104 may answer the question "when the encoder 116 provided the PCR timestamp, what was the NTP time?" and therefore synchronize the client 104 with the encoder 116 with reduced jitter and synchronized frequency. A variety of other examples are also contemplated without departing from the spirit and scope thereof.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
allocating timestamps derived from a universal time source to respective program clock reference (PCR) timestamps in content received by a network operator during an interval of time to form ordered pairs of timestamps, each of the ordered pairs including one said timestamp derived from the universal time source and one said PCR timestamp;
computing an approximation of a plurality of the ordered pairs of timestamps for the interval; and
adjusting the approximation using an ordered pair of timestamps taken from a previous said approximation.

2. A method as described in claim 1, wherein the approximation is computed using a curve-fitting technique.

3. A method as described in claim 2, wherein the curve-fitting technique uses a Least Square Algorithm.

4. A method as described in claim 1, further comprising outputting the content with ordered pairs of timestamps taken from the adjusted approximation by the network operator for receipt by a client that is configured to render the content.

5. A method as described in claim 4, wherein the ordered pairs of timestamps taken from the adjusted approximation are configured to be used by the client to synchronize a clock that is local to the client to a clock used by an encoder of the network operator that provided the PCR timestamp.

6. A method as described in claim 1, wherein the network operator is implemented via a distributed computing system.

7. A method as described in claim 1, wherein the content is configured according to Motion Pictures Experts Group (MPEG) protocols.

8. A method as described in claim 1, wherein:
the distributed computing system of the network operator includes an encoder that provides the PCR timestamps and a server that performs the allocating of the timestamps derived from a universal time source to the respective PCR timestamps;
the universal time source is derived from network time protocol (NTP); and
the encoder is communicatively coupled to the server over an Internet Protocol (IP) network.

9. A method as described in claim 1, wherein the approximation is computed to address clock drift of two or more clocks employed by the network operator.

10. A method as described in claim 1, wherein the approximation is computed such that jitter is reduced in the timestamps derived from the universal time source that are allocated to the respective program clock reference (PCR) timestamps.

11. A method as described in claim 1, wherein the content is linearly shifted in time.

12. A method as described in claim 1, wherein the universal time source is based on an atomic clock.

13. A method as described in claim 12, wherein the program clock reference (PCR) timestamp is not based on an atomic clock.

14. A method, implemented by a network operator, the method comprising:
collecting a plurality of points that describe an interval of time, wherein each said point is defined using a program clock reference (PCR) timestamp and a timestamp derived from a universal time source;
calculating a line to approximate the plurality of points for the interval;
adjusting the line based on at least one point that is included on another line that describes a previous said interval of time; and
transmitting an ordered pair of timestamps that correspond to a particular said point from the adjusted line.

15. A method as described in claim 14, wherein the line is assigned using a curve-fitting technique.

16. A method as described in claim 15, wherein the curve fitting technique includes linear regression.

17. A method as described in claim 14, wherein the adjusting is performed by computing the adjusted line from at least one said point from the calculated line and the at least one point that is included on the other line.

18. One or more computer-readable storage media comprising computer-executable instructions that, when executed by a client, direct the client to synchronize a clock local to the client using a network time protocol (NTP) timestamp and a respective program clock reference (PCR) timestamp received in content from a network operator and taken from a line that approximates an interval of time of NTP and PCR timestamp combinations that is adjusted using a previous said line.

19. One or more computer-readable storage media as described in claim 18, wherein the content is a television program.

20. One or more computer-readable storage media as described in claim 18, wherein:
   the program clock reference (PCR) timestamp was provided by an encoder of the network operator; and
   the network time protocol (NTP) and the PCR timestamps combinations enable the client to determine what was an NTP time when the encoder provided respective said PCR timestamps.

\* \* \* \* \*